Nov. 24, 1936.

C. F. BECKWITH ET AL 2,061,608

LIQUID SUPPLY SYSTEM

Filed Dec. 18, 1929

Inventors
CHARLES F. BECKWITH
C. CURTIS MAIN
By their Attorneys
Bohleber + Ledbetter

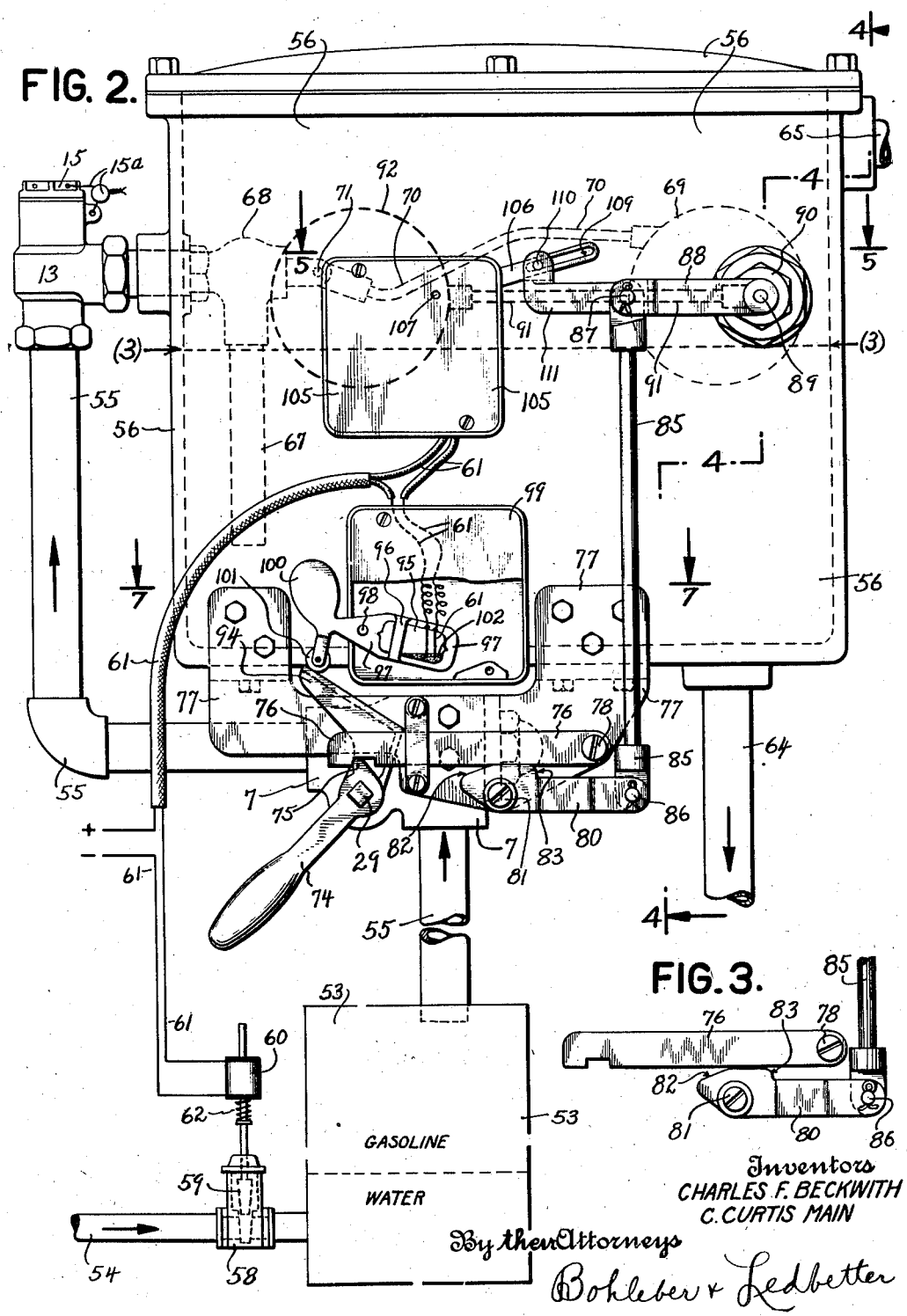

Nov. 24, 1936.   C. F. BECKWITH ET AL   2,061,608
LIQUID SUPPLY SYSTEM
Filed Dec. 18, 1929   6 Sheets-Sheet 3
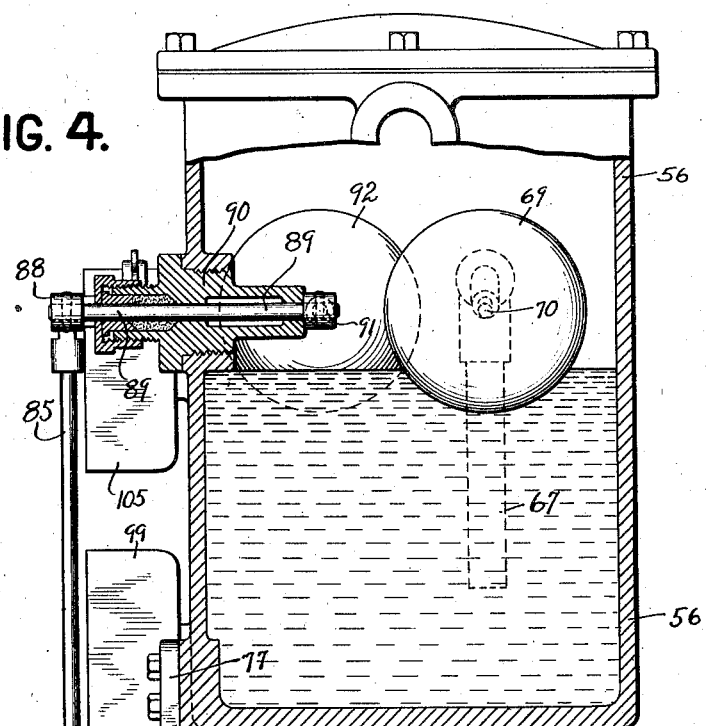
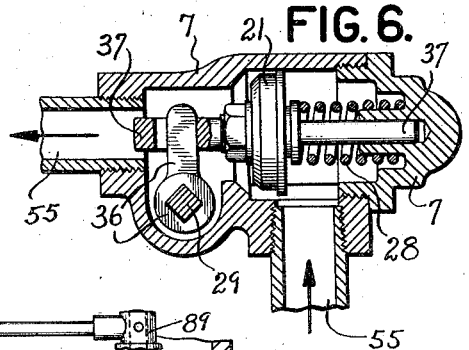
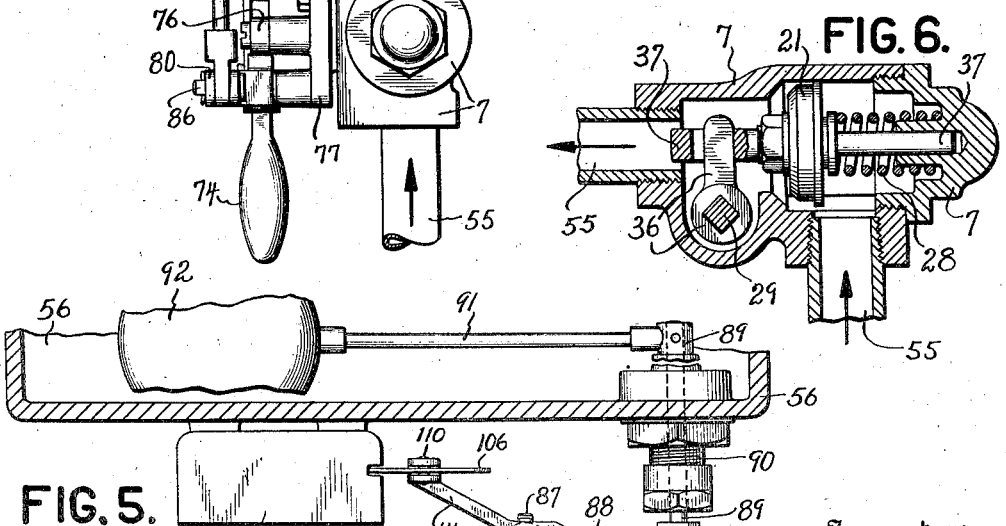
Inventors
CHARLES F. BECKWITH
C. CURTIS MAIN
By their Attorneys
Bohleber & Ledbetter Nov. 24, 1936. C. F. BECKWITH ET AL 2,061,608
LIQUID SUPPLY SYSTEM
Filed Dec. 18, 1929 6 Sheets-Sheet 4
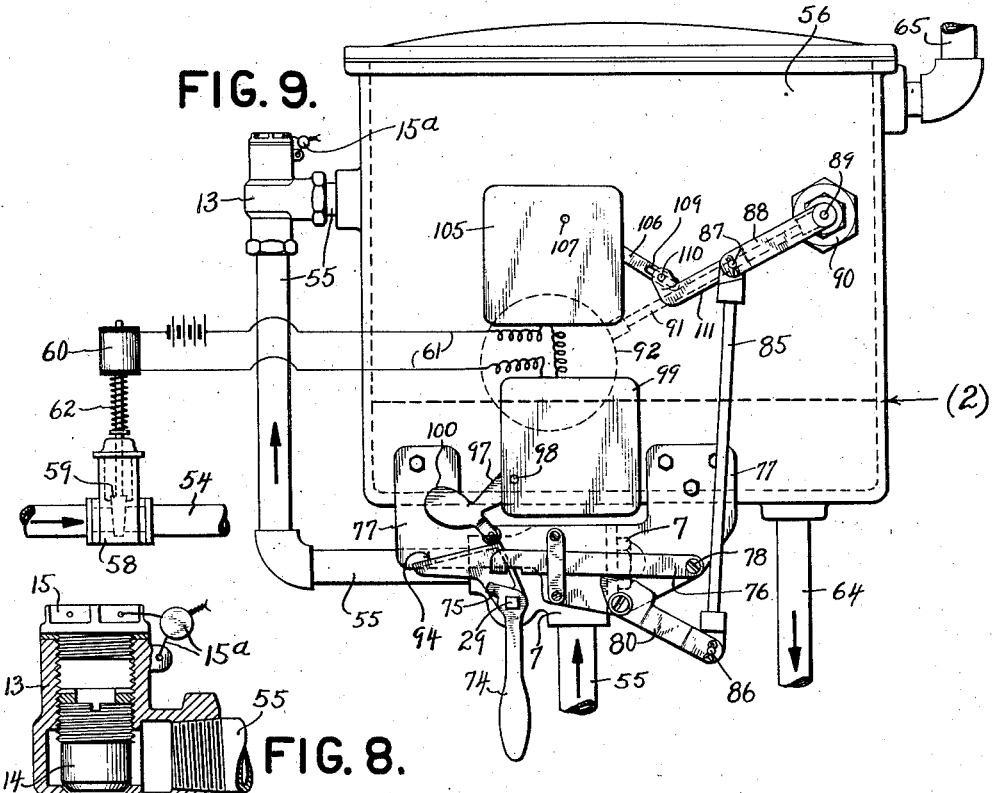
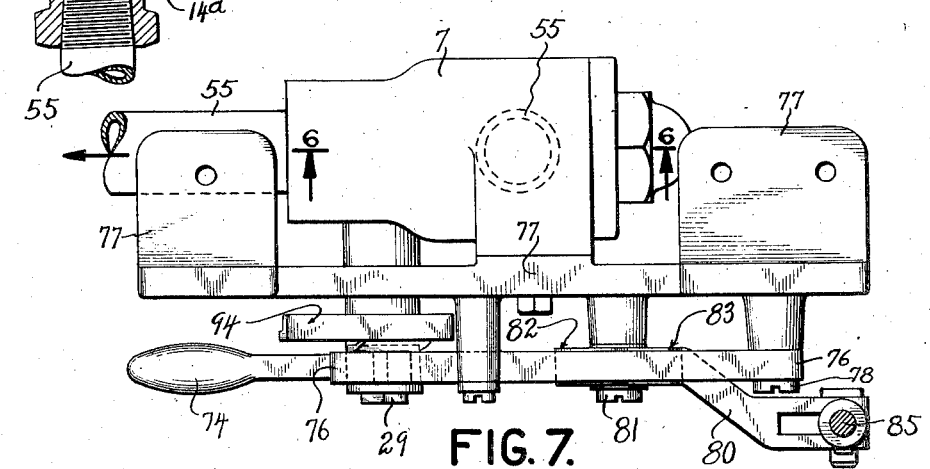
Inventors
CHARLES F. BECKWITH
C. CURTIS MAIN
By their Attorneys
Bohleber & Ledbetter

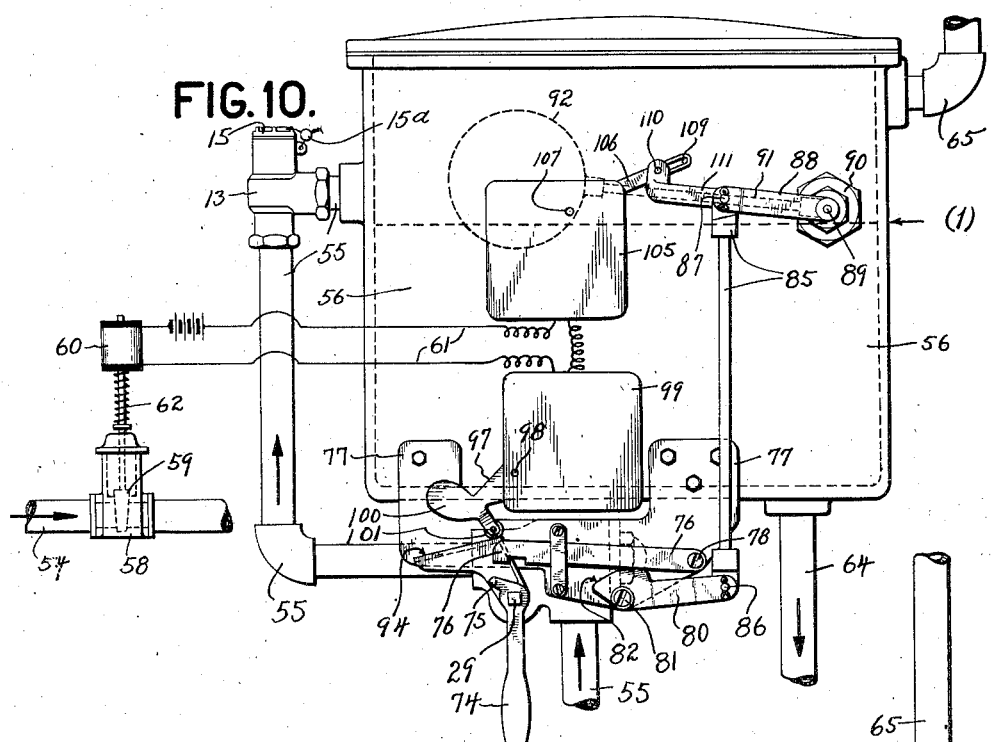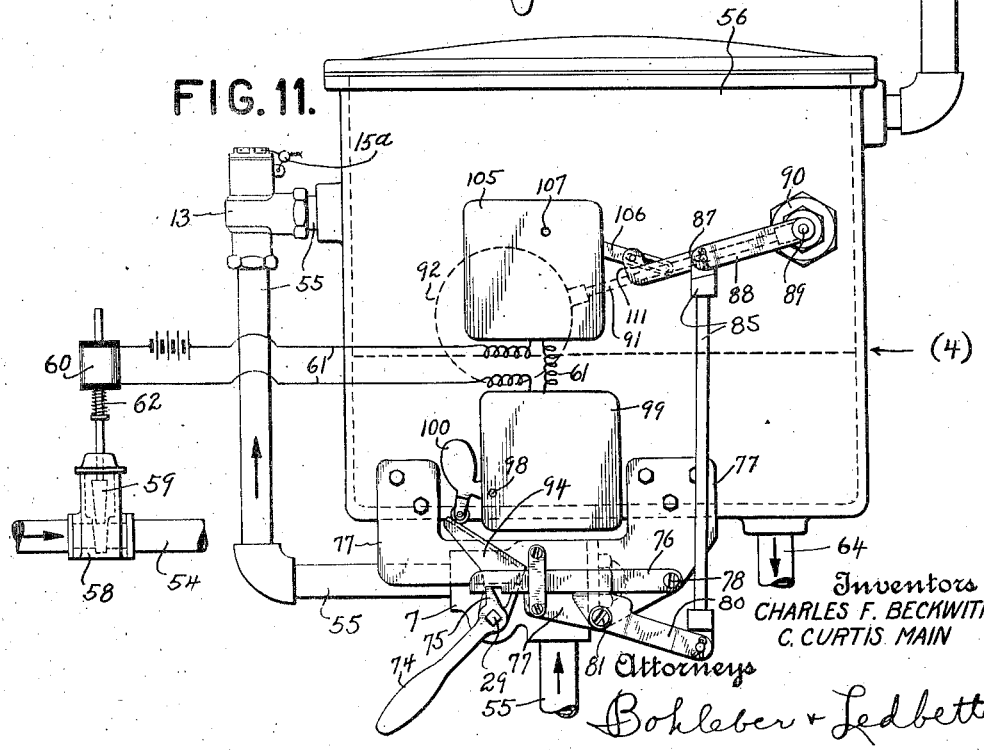

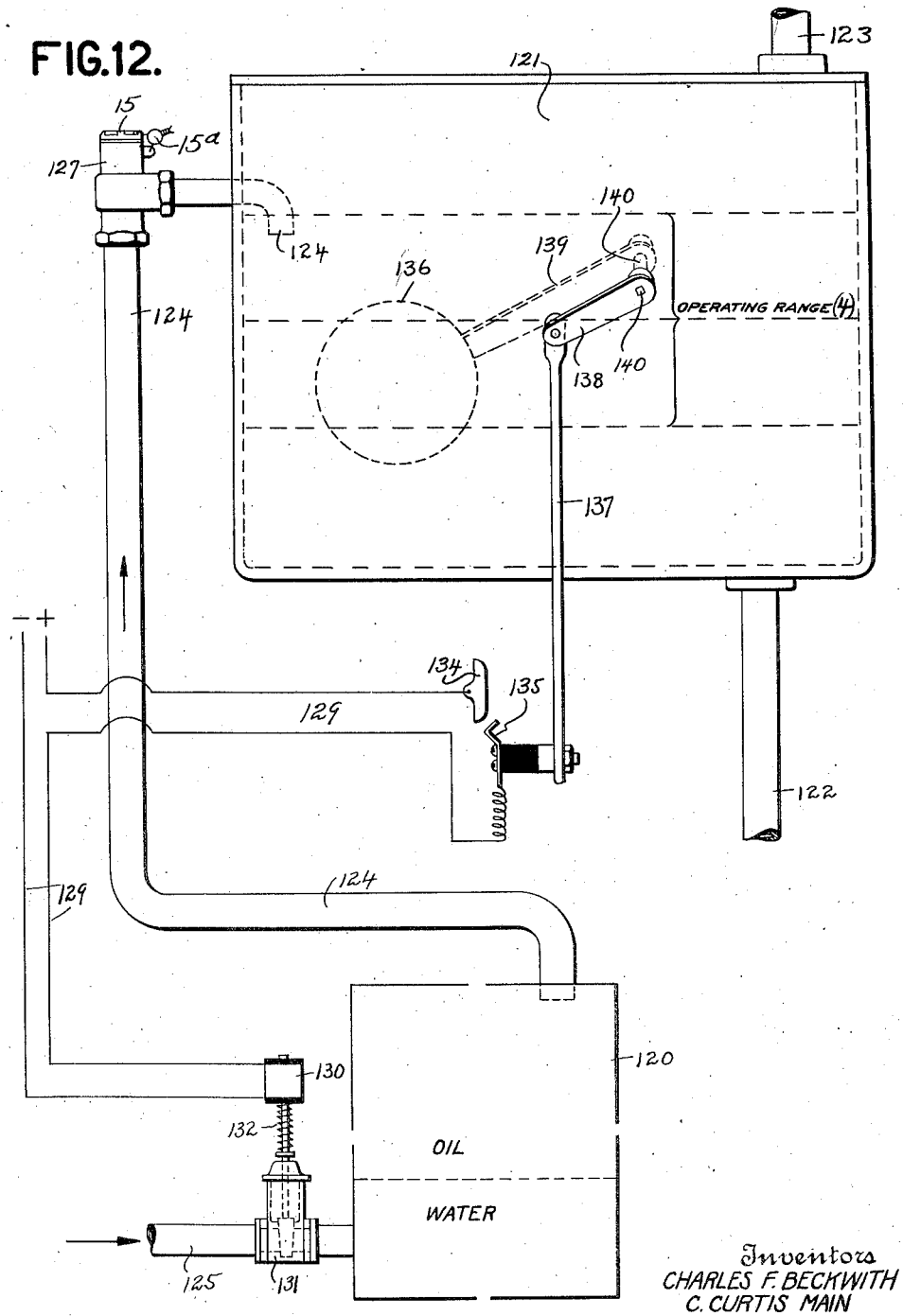

Patented Nov. 24, 1936

2,061,608

UNITED STATES PATENT OFFICE 2,061,608

LIQUID SUPPLY SYSTEM

Charles F. Beckwith, Flushing, and Charles Curtis Main, Piermont, N. Y., assignors, by mesne assignments, to Reconstruction Finance Corporation, New York, N. Y., a corporation of United States Application December 18, 1929, Serial No. 414,866

17 Claims. (Cl. 137—68)

This invention relates to liquid handling, dispensing or supply systems for all purposes. More especially, the invention relates to systems for handling gasoline, oil, or any other fuel, or in fact any liquid which hereinafter will be generally termed fuel, and for feeding such fuel to motor vehicles, but more particularly for feeding fuel by gravity to one or any number of internal combustion engines operating on test and being adjusted and run in.

Among other things, an object is to produce a safe gravity-feed liquid or fuel supply system for factories, laboratories, testing plants, dynamometers and the like whereby a liquid or liquid fuel such as gasoline may be safely and positively supplied under a constant head and hence a uniform pressure to one or more engines running on test and which is incident to the manufacture of internal combustion engines on a production scale. In the mass production of internal combustion engines, it is necessary to run in, test and adjust the engines on a large scale or in large numbers, and this work is usually performed on a varying number of engines simultaneously running. It is necessary therefore that an efficient fuel supply system or apparatus be provided, one which is flexible and easy in its adjustment and which will positively feed fuel equally well to a small or large number of engines and never fail, despite the fact that the rate of consumption may vary to a large extent due to the varying numbers of engines being run in, tested and adjusted, preliminary to release for sale or assembly in automotive vehicles to which they are adapted.

It is therefore an object to produce a gravity-feed liquid supply apparatus which includes inflow piping running from a storage tank to a relatively small overhead receptacle and discharge piping from said receptacle to the engines or other liquid fuel consumer, together with a flow-regulator valve mounted in the inflow pipe whreby the inflow of liquid may be adjusted to equal a predetermined rate of consumption and this arrangement makes for safety because only a small quantity of fuel need be carried on hand in the overhead gravity-feed receptacle or chamber.

A further and particular object of the invention is to provide, in a piping system leading from a storage tank through the gravity-feed supply receptacle or system to the place of consumption, a safety shut-off or cut-off valve means which is sensitive to either an over or under supply of liquid fuel, and even sensitive to a leak or other waste in the discharge pipe or vent pipe line. Hence when any of these abnormal conditions develop, the safety cut-off means acts to close the inflow pipe through which the liquid is pumped or otherwise elevated from a storage tank to the overhead gravity-feed supply receptacle.

Another object is to provide an electric circuit and switch means for controlling the pumping of liquid from a storage tank up to the liquid supply apparatus or small size gravity-feed receptacle whereby the pumping means stops operation simultaneously with the closure of the heretofore mentioned safety cut-off valve. To this end, there is provided a joint switch and cut-off valve operating means which opens a switch to stop operation of the electrically operated pump or hydraulic elevating means simultaneously with the closing of the safety valve in the inflow pipe. This arrangement removes all liquid pressure from the piping system and makes for safety. The safety factor is further increased by a second switch in series with the first in the electric power line and either switch insures the stopping of the electric pump or hydraulic pumping means when the pipe therefrom is closed to stop the flow of liquid. The apparatus is therefore inherently safe and is operative to stop the liquid flow should either one of the switches break, stick or otherwise fail to open the electric circuit which controls the pumping means.

This fuel supply system may be quickly adjusted at its flow-regulator valve, reset and again started in operation to compensate for the increased or decreased consumption of fuel as the case may be, but the very necessity for that adjustment and restarting of the apparatus enables the operator or tester to detect a leak in the pipe system running to the point of consumption if a leak has occurred, or enables the operator to adjust the apparatus so that the rate of fuel inflow to the overhead receiving chamber and the discharge rate therefrom is about equal. If unequal, the automatic controlling devices of this invention become active due to the differential or inequality of flow between the inflow pipe and discharge pipe already explained, and such action simultaneously stops the electric pumping means and also causes to be closed the normally open cut-off valve in the inflow pipe leading from the pumping means upwardly to the gravity-feed overhead tank of limited capacity.

In other words there are provided a normally-open but power closed safety cut-off valve and one or more switches in series, all operatively combined so that the valve and switch or switches work in unison, and the safety cut-off valve closes when a switch opens and vice versa. This combination valve and switch means function under either of two conditions; first, when the rate of liquid supply exceeds the rate of consumption, or when the rate of consumption exceeds that of the supply. In either event, the apparatus automatically operates and positively stops the flow of fuel from a storage tank upwardly through a feed line to the receiving or small storage chamber of limited capacity.

The invention also comprehends and it is an object to provide a liquid handling apparatus wherein a float in the overhead gravity-feed receptacle opens a switch at high or low level position, which switch controls a remotely located hydraulic-pumping or liquid-elevating means, the normally-open self-closing valve heretofore mentioned being omitted from the piping system but nevertheless providing an efficient apparatus, although for highly inflammable fuels, such as gasoline, it is preferred to employ the safety cut-off valve.

The invention is illustrated in the accompanying drawings wherein one or more examples are shown and it is understood that changes in construction necessarily may be made without departing from the principles involved. The drawings in reality first show a diagram in Figure 1 to illustrate the principles involved where the switch means and a self-closing valve is used, and then show one preferred example of construction beginning with Figure 2 and running through Figure 11, followed by another diagram in Figure 12 showing the apparatus with the safety cut-off valve omitted.

Figure 1 is a diagram of the invention with its immediate and accessory parts laid out in operative relation. This view shows the combination electrical and mechanical control comprising an interconnected valve and switch which constitutes a double positive control or liquid flow shut-off, all of which is sensitive to a change in liquid level in the gravity-feed receiving chamber. The diagram shows the various operating liquid levels, for example, (1) is high-safety shut-off level above which the liquid cannot rise; (2) is low-safety shut-off level below which the liquid cannot fall; (3) is the normal liquid level which is that position automatically held by the liquid surface in the chamber when the balance between the rate of consumption and rate of inflow is properly gauged and adjusted by a flow-regulator valve to be equal; and (4) is the operating range throughout which the liquid level may vary without causing the apparatus to automatically stop the inflow of liquid to the overhead receiving chamber. A bulk storage tank (usually underground) and pumping means are shown at the bottom of the view and from which the liquid supply apparatus receives its fuel to be dispensed. No liquid fuel is assumed to be in the gravity-feed chamber in Figure 1 and consequently the float is down to the low-safety shut-off level limit (2) and the circuit is open.

Figures 2 through 11 show one preferred form of construction and are presented, in addition to the diagram in Figures 1 and 12, as showing special structural features of one concrete embodiment of the invention.

Figure 2 is a side view of the apparatus with the parts positioned at normal operating level, i. e., the position or level line (3) in Figure 1, which means that the rate of liquid supply or inflow upwardly to the receiving chamber is about the same rate as the consumption thereof from a discharge pipe leading from the chamber to the engines or other place of consumption. A bulk storage tank is also shown together with the inflow pipe connected thereto, as well as hydraulic pumping means to force the liquid from the tank up to the receptacle and apparatus, from which the liquid feeds downwardly by gravity under a predetermined head or pressure to the place of use.

In both Figures 1 and 2, an electric circuit connects the apparatus with a pumping means and the invention provides automatic means for breaking this circuit to stop the pumping of liquid when too pronounced a difference in rate of flow is reached in an inflow and discharge pipe leading to and from the apparatus.

Figure 3 shows a detached view of a latch and release therefor which normally holds open a power-operated self-closing safety valve to retain the latter in normal manually set-open position ready to be automatically closed by a weight, a spring, an electric motor or other power means arranged to close the valve. The position of the parts are the same as in Figure 2.

Figure 4 is a fragmentary sectional view through the overhead gravity-feed chamber of the apparatus taken on the line 4—4 of Figure 2.

Figure 5 is a fragmentary top or plan view as developed on the line 5—5 of Figure 2 showing operating connections between a float and a switch which is both opened and closed by the float or other equivalent means which is sensitive to a difference in rate of flow between the supply and consumption.

Figure 6 is a longitudinal sectional view of a normally-open self-closing power-operated safety cut-off valve mounted in the intake pipe between the large underground storage tank and the smaller size overhead gravity-feed receiving chamber of the apparatus and the valve is shown open.

Figure 7 is a detached plan-assembly view of the safety valve and its latch and trip control devices carried on a bracket which is removed from the receiving gravity-feed chamber.

Figure 8 is a longitudinal section of a manually-adjustable flow-regulator valve by which an operator adjusts the rate of inflow to equal that of the discharge.

Figure 9 shows a side view of the apparatus at low-safety shut-off level, position (2), and hence in that tripped or operated position assumed when the rate of liquid consumption is greater than the inflow or feed from storage to the receiving chamber.

Figure 10 shows the position of the apparatus at high-safety shut-off level. The device has already functioned to open all switches and cause the safety valve to close due to a greater inflow of fuel to the receiving chamber than discharge therefrom and is the reverse condition of that shown in Figure 9.

Figure 11 shows a side view with the parts at low-liquid level but still within the normal operating range, position (4). If the liquid level lowers further, the apparatus will trip and inflow thereto will stop.

Figure 12 is a diagram of the invention in its simplest form in that the safety valve is omitted from the inflow pipe line but a float opens a switch at either high-liquid or low-liquid level to stop the flow upwardly from the storage tank to the gravity-feed receptacle.

Figure 1:
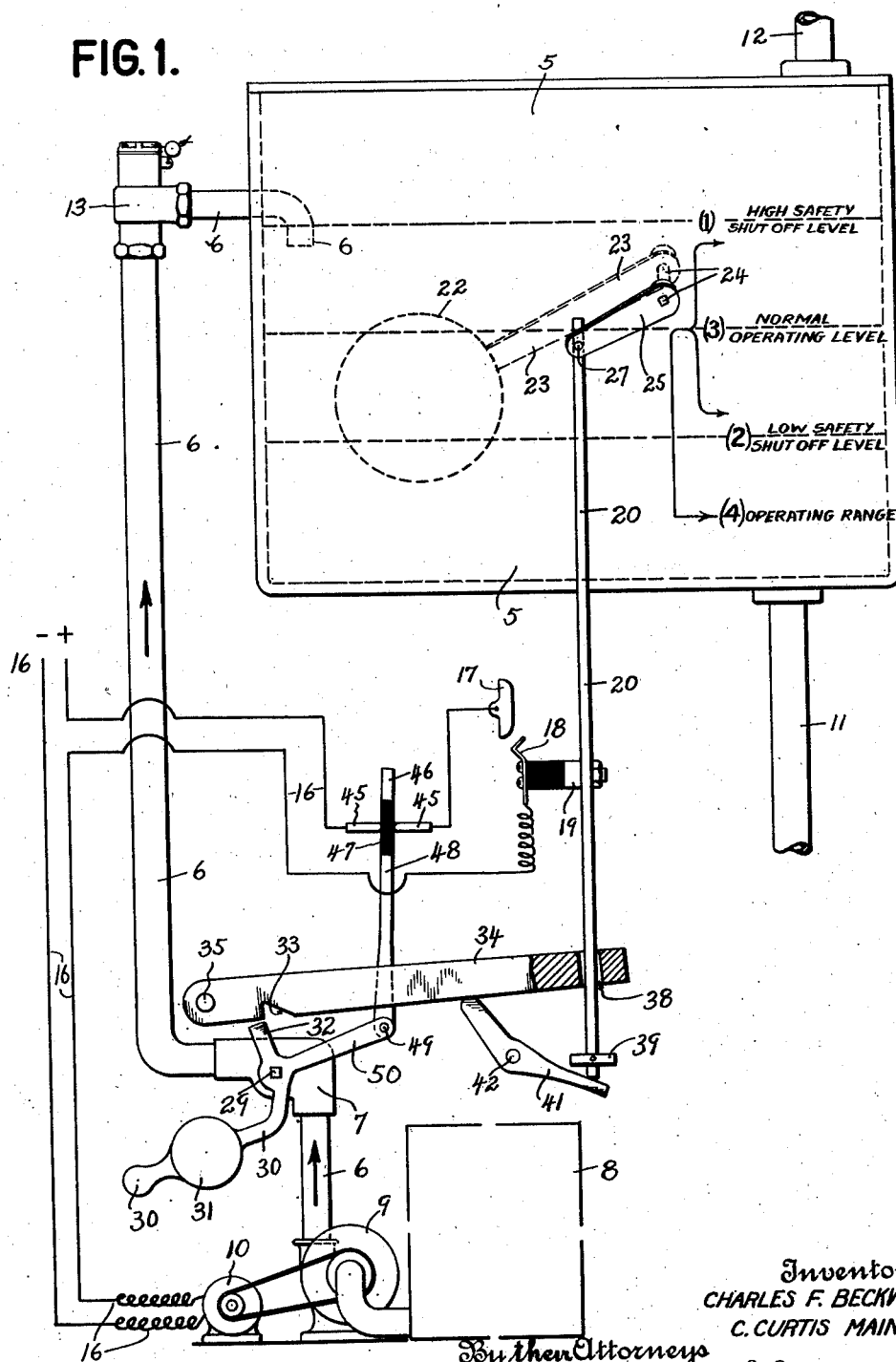

Referring now more particularly to the drawings for a detailed description of the invention and first describing Figure 1, there is shown what may be called a receiving or gravity-feed storage chamber 5 of limited capacity into which is received any liquid, and particularly a liquid fuel to be handled or dispensed, and from which the fuel is fed or discharged to engines running on test or to any other point or place of consumption. An inflow pipe 6 connects with the receiving chamber 5 and a metering device not shown may, of course, be included therein if desired for measuring the liquid passing upwardly to the chamber 5. A normally-open self-closing safety valve 7 (detailed in Figure 6) is included in the inflow pipe 6, the latter connecting with a bulk-storage tank 8 ordinarily located underground or at any other suitable place.

It is usual to provide a pumping means for elevating the liquid from the storage tank 8 up to the receiving or gravity-feed chamber 5, and this is ordinarily accomplished by use of a hydraulic-flow system or by a motor driven pump as desired and is generally referred to herein as pumping means. In Figure 1 a pump 9 is driven by a motor 10 and forces liquid fuel upwardly through the inflow pipe 6, through the normally-open safety valve 7, and through a sealed manually-adjustable flow-balance or flow-regulator valve 13 (detailed in Figure 8) to maintain a constant head or level and hence a constantly uniform pressure of liquid fuel in the chamber 5 which is adapted to be fed downwardly by gravity through a discharge pipe 11 which connects with the consuming apparatus, such as an engine or other using means drawing liquid from the temporary storage gravity-feed chamber 5. The valve 7 as stated is a normally-open valve and it automatically closes when the head or level of fuel in the chamber 5 moves out of, either above or below, its normal operating range position (4).

The safety cut-off self-closing valve is shown in Figure 6 and its valve housing 7 is interconnected in the pipe line 6 with a valve disc or head 21 interposed between the two connecting pipe ends 6 to open and close a passage through the valve. A spring or other power means 28 is normally tensioned to exert a closing force against the valve disc 21 to close the flow through the pipe 6. An operating shaft 29 is journaled in the valve housing 7 and carries an arm 36 operatively engaging a valve stem 37 on which the spring closed valve disc 21 is carried. By manually rotating the shaft 29 clockwise, it is apparent that the valve disc 21 is shifted to the right against the tension of the spring 28, thereby opening the valve which ordinarily is done manually by swinging a handle 30 fixed to the rock shaft 29. A lock-open latch or retaining means 34 holds the valve disc 21 in open position against the pressure of the spring or other power closing means, as will be more fully understood when that part of the construction is reached for description.

The apparatus constituting this invention is a positive gravity-feed system and is interposed between any suitable storage tank 8 and the engines running on test or other consuming apparatus (not shown) at the feed-end of the discharge pipe 11, and it is desirable to make the receiving chamber 5 comparatively small so that a limited amount of fuel is carried in storage above the level of the point of consumption so that a restricted amount of fuel is on hand to spill or waste in case of a leak in either the discharge pipe 11 or intake pipe 6, or at one or more of the engines. Since the chamber 5 is of limited capacity, it is desirable that the rate of flow through the pipe system 6—11 be equalized, i. e., equal in each pipe 6 and 11. In case the rate of reception of fuel through inflow pipe 6 to the gravity-feed chamber 5 is greater than the rate of consumption thereof out through discharge pipe 11, it is apparent that the chamber 5 would overflow and hence waste fuel through its vent pipe 12, thereby increasing the fire hazard.

On the other hand, if the foregoing condition is reversed and the consumption of fuel from discharge pipe 11 is greater than the inflow of supply through pipe 6, it follows that the engines or other consuming apparatus at the end of said discharge pipe 11 then fail to receive an adequate supply of liquid. Such possibility of failure is very undesirable because on test runs and especially endurance, there must be no let up of fuel supply else much valuable time and test data is lost, and means are provided in the Figure 8 valve to insure adequate fuel flow for an increased consumption. Likewise, an accident causing a leak somewhere in the discharge pipe 11 constitutes a heavy or abnormal draw of fuel from the gravity-feed chamber 5 and thus again the discharge is greater than the rate of reception. Under all of these conditions, the automatic control apparatus of this invention functions to positively stop the inflow of fuel from the storage tank 8 up to the gravity-feed receiving chamber 5.

For the reasons stated there must be a well balanced rate of flow, which is attained by a proper adjustment of valve 13, as will be explained, through the piping system 6—11, else the supply apparatus automatically stops and refuses to function until the differential in flow is eliminated and this is done by adjustment of the flow-rate or flow-regulator valve 13, the use of which is next described, and an exemplary form of which is shown.

A detail view of the flow-regulator valve 13 is shown in Figure 8 where 13 is the valve housing connected in the inflow pipe line 6. This flow-regulator valve includes a manually screw-threaded adjustment plug 14 which is anchored against displacement by a lock nut screwed down against the plug once the latter is properly set to enlarge or restrict a flow passage 14ᵃ. The housing 13 may be closed by a plug 15 which is secured in place by a seal 15ᵃ. When the inflow of fuel upwardly through the pipe 6 is inadequate to supply the consuming apparatus fed from the discharge pipe 11, the adjustment plug 14 is backed away from and enlarges the flow passage 14ᵃ. On the other hand, when the inflow upwardly through pipe 6 is too great for the rate of consumption or use flows downwardly through discharge pipe 11, this adjustment plug 14 is screwed toward and closes the flow passage 14ᵃ. In other words, the flow passage 14ᵃ should be properly adjusted so that a balanced condition in rate of flow exists in the piping system 6—11 whereby the rate of consumption from pipe 11 just equals the rate of inflow through pipe 6.

There is shown in Figure 1 a diagrammatic form of electric circuit 16 supplying current to the motor 10 driving the pump 9 and hence pumping liquid from the storage tank 8 up to the gravity-feed chamber 5. This circuit 16 is under the control of positive circuit opening and closing means including one or more switches, preferably two, so that the electric motor 10 is unfailingly stopped in case an abnormal differential in rate of flow takes place through the two pipes 6 and 11 due to a leak or change in volume of consumption. In this connection a switch is provided comprising parts 17 and 18, whereof one part 17 may be a fixed contact connected to one side of the circuit 16 and the part 18 may be a slide flexibly connected to the other side of the circuit 16. The circuit 16 is open or broken when the slide 18 moves off either end of the stationary contact 17 and is closed by sliding the two contacts 17 and 18 together from either end of the contact 17. An insulated arm 19 mounts the switch slide 18 in operative position and this arm 19 may be carried on a movable member shown here as a reciprocating rod 20 under the control of means sensitive to a difference in rate of flow between the inflow pipe 6 and discharge pipe 11.

Since it is desirable to open the switch 17—18 when an abnormal differential in rate of flow occurs between the pipes 6 and 11, some suitable switch-actuating mechanism is necessarily employed and which is sensitive to that difference in rate of flow. Float means is satisfactory for this purpose and to that end the gravity-feed chamber 5 is provided, not only for the operation of the float means but to carry a limited supply of fuel as well so that the latter may be fed by gravity to the point of consumption. An example of a simple type of float means comprises a float 22 carried on an arm 23 fixed to a horizontal shaft 24 journaled in the walls of the chamber 5. The float 22 rides on the surface of the liquid fuel in the chamber 5 and the rise and fall thereof swings the free end of an arm 25 up and down, the other end of the arm 25 being fixed on that end of the shaft 24 which projects through the wall of the chamber 5. The arm 25 is pivotally connected at 27 to the rod 20 which carries the switch slide 18 and is adapted to open and close the switch 17—18 which opens to break the circuit 16 whether the float 22 rises abnormally high in the chamber 5 or falls abnormally low therein, because the slide 18 is designed to open the circuit 16 by riding off either end of the contact member 17.

The switch 17—18 is operatively connected with the heretofore mentioned safety cut-off valve 7 by the latch means 34 and related parts. Any suitable form of motor means, such as a weight 31 or compression spring 28 is correlated with the valve 7, in this instance, through a handle 30, for automatically rotating the shaft 29 in an anti-clockwise direction to close said valve 7 when a substantial difference in rate of flow occurs between the pipes 6 and 11. A weight 31 and/or spring 28 are combined or used alone as motor means to automatically close the normally-open valve 7 and by reference to Figures 1 and 6 this is apparent.

The valve opening handle 30 or shaft 29 carries a catch 32 which is engaged by a hook or notch 33 in the latch 34 pivoted on a frame or stationary pin 35. The engagement of the latching arrangement 32—34 holds the valve-operating shaft 29 in fixed position to restrain or lock the valve 7 open against self closure by the weight 31 or spring 28, constituting what may be termed power or motor means for actuating the valve 7. It is noted that release of the latching assembly 32—34 allows the weight 31, spring 28 or other self-acting motor means, to rotate the shaft 29 counter-clockwise and hence close the valve 7, thereby positively stopping the upward flow of fuel through the pipe 6 to the chamber 5, and means for automatically effecting that release at the right time will now be described.

The outer free end of the latch 34 is operatively connected with the float means 22 whereby either up or down movement of the liquid level in the chamber 5 causes disengagement of the latching assembly 32—34. To this end and as a mere example of the construction, the latch 34 is made with a hole 38 through which freely slides the lower end of the switch operating rod 20. A stop or head, such as a nut or pin 39, is anchored to the lower end of the rod 20 underneath the latch 34, so that upward motion of the rod 20 draws the head 39 against the latch 34 to lift it and hence disengage the latch notch 33 from the valve hold-open catch 32, thereby enabling the weight 31 to automatically close the safety valve 7 in case the float 22 rises above the normal operating fuel level in the chamber 5.

On the other hand, it is also desirable to trip the latch 34 and hence cause the valve 7 to close itself when the normal-operating fuel level falls below the proper operating range in the chamber 5. This is accomplished by pivoting an intermediate lever 41 on a frame or stationary pin 42. This lever 41 is depressed at one end when the rod moves downwardly and hence tilts upwardly at its left end to indirectly lift the latch 34 in the same manner that it is directly lifted by the rod 20 when the latter lifts. In other words, the latch 34 is released by an upward movement through the agency of the head 39 and lever 41, regardless of whether the float 22 moves up or down. So soon as the float, and hence the liquid level, moves out of its normal operating range, above or below, the latch 34 releases from the catch 32, affording a self-closing action of the safety cut-off valve 7.

Once the difference in rate of flow between the piping system 6 and 11 causes an abnormal change of the liquid level in the chamber 5 and hence trips the valve 7 lock-open or retaining means 32—34, the safety valve 7 then remains closed until an operator manually resets and opens it by lifting the handle 30—31 and placing the catch 32 in the latch notch 33 to hold the valve 7 open against the pull of the weight 31 or spring 28. The very necessity for this manual resetting of the gravity-supply apparatus compels the operator to look about for the cause of the automatic stopping of the system, and this insures discovery of a leak or other conditions which should be corrected.

It is also desirable that the circuit 16 positively open and remain so until the apparatus is again started in operation as next above explained for the reason that it is essential that the pumping means 9—10 be stopped at the same time that the valve 7 is closed. If the motor 10 is not stopped, the pressure of pump 9 on pipe line 6 is a serious hazard because of the likely development of a leak or other trouble caused by the pump 9 forcing against the closed valve 7. While the float-operated switch 17—18 is usually adequate, its possible failure is insured against by use of another or supplementary switch in series to also open the circuit.

A supplementary switch 45—46 is therefore placed in the circuit 16 in series with the switch 17—18. This second switch 45—46 is automatically opened and held open by the closing force of the valve 7, but this switch is manually closed by an attendant and is shown diagrammatically with stationary contacts 45 connected to one side of the electric circuit 16, together with a contacting slide 46 carried on an insulator block 47 mounted on a switch operating link 48. The link 48 is pivotally connected at 49 to an arm 50 integral with the handle 30 or otherwise anchored to the valve-operating shaft 29. This assembly of parts interconnects the normally-closed switch 45—46 with the normally-open valve 7 so that these two elements are jointly operated and hence when the valve 7 closes, the switch 45—46 opens and vice versa. It is clear therefore that once the pipe line 6 is closed by the valve 7, no liquid pressure occurs in the pipe, and this is insured by the double circuit opening means provided by the two switches 45—46 and 17—18 merely arranged in series in the drawings but quite susceptible of a multiple arrangement with the motor 10 if desired.

It is true that the float-operated electric switch 17—18 automatically breaks the electric circuit 16 and stops the electric motor 10 and pump 9 when the latch 34 releases the power means 31 for closing the valve 7. Even so, the additional safety factor in the valve-operated switch 45—46 is interposed so as not to be entirely dependent upon operation of the switch 17—18 and this additional factor insures against breaking or sticking of the float operated switch 17—18. In this way, the pressure applied to the fuel to lift it to the gravity-feed chamber 5 is always removed when the valve 7 is closed and danger is thus reduced to a minimum.

The printed diagram of various levels shown in the chamber 5 simply aids an understanding of the invention and it is appreciated that the float 22, and hence the level or head of fuel in the chamber 5, preferably remains around the normal-operating level line (3) indicated as a normal, predetermined and preferred operating liquid level. On the other hand, the liquid level in the chamber 5 may operatively vary between the upper and lower lines marked (1) high safety shut-off level and marked (2) low safety shut-off level without closing the valve 7. So long as the liquid level remains between the two upper extremes (1) and (2), the automatic apparatus will not function to close the valve 7 and open the switches 45—46 and 17—18. The flow-regulator valve 13 should be adjusted to attain this end.

Further reference is now made to the switches and their separate and joint uses wherein the switch 17—18 is a normal-operating switch and is entirely under the control of the float 22 and hence is opened and closed by that float. When the float 22 moves nearly to position (1) high-safety shut-off level or nearly to position (2) low-safety shut-off level, the normal-operating switch part 18 then opens the circuit 16 by sliding off the upper or lower end of the contact 17. However, the switch 17—18 is immediately closed again by action of the float when the latter again moves back to its operating range, position (4). In other words, the circuit 16 is open to stop the upward flow of liquid through inflow pipe 6 to the gravity-feed tank 5 when the liquid level tends to move above or below the operating range (4) and that action keeps the liquid level below the high safety shut-off level without likelihood of shutting down the whole system which would occur if the safety valve 7 were closed.

In the event that the normal-operating switch 17—18 fails for any reason to function, should it stick or break, or if for some other reason, the liquid level gets out of the operating range, the motor-operating switch 45—46 is brought into play by the level of the liquid in the chamber 5 receding below or rising above the operating high and low level. Should the float 22 move above or below level lines (1) or (2) then ultimate action takes place and the position of all parts is as shown in Figure 1 where both switches are open, the switch 45—46 opening positively and simultaneously with the closing of the valve 7. When that action has taken place, the entire system is closed down and cannot again be started except by the attendant who must manually lift the handle 30 and engage the catch 32 in the latch or trigger notch 33, and to accomplish the latter he lifts the rod 20 so the latch 34 will come down to operative holding position.

It is now seen that the one switch 17—18 ordinarily maintains a normal-operating fuel level in the gravity-feed tank 5 by opening and closing as the float approaches the upper or lower limits of the normal-operating level, and that the other switch 45—46 is a safety switch which acts conjointly with the safety valve 7, driven by positively-operating motor means, to close down the entire system in event of extraordinary circumstances. This construction insures safety in fuel feed apparatus because switch 17—18 functions while the float is well within the limits of the high (1) and low (2) safety shut-off levels, and both switches open should the float actually reach those limits. The float means shown are mere examples of liquid-contacting means or instrumentalities in contact with the liquid sensitive to its rate of flow to detect a change in rate of flow to govern the automatic mechanism.

A description will now be given of the second and a preferred form of the invention shown in Figures 2 to 11 inclusive. In this connection, a hydraulic-pumping means is shown for elevating fuel from a storage tank 53, usually placed underground, to the gravity-feed supply apparatus. The hydraulic system is controlled by an electric circuit 61 and is similar in that respect to the pumping system shown in Figure 1. There is employed an electrical circuit and switch means quite similar to that of Figure 1, except that in Figures 2 through 11 the electric circuit is merely used for opening and closing a water-inlet valve 58 instead of stopping and starting a motor 10 as in Figure 1, and that water valve stops and starts the hydraulic lifting of the fuel from the source of supply 53 to the gravity-feed chamber 56 of the apparatus.

While neither the hydraulic-pumping or liquid elevating system per se, shown in Figures 1 and 2 through 11, respectively, alone constitutes the invention, still they are briefly described as a background and to show them in the general inventive combination. The underground tank 53 stores fuel or the liquid to be handled and a water pipe 54 is connected with this tank. The other end of the pipe 54 connects with the city or other source of water supply, and water is fed through the pipe 54 into the bottom of the tank 53 to float or displace the fuel on top of the water, as is well known, up through an inflow pipe 55 connected at the top of the storage tank 53, and said pipe 55 leads to a gravity feed receiving chamber 56 used for the same purpose as the chamber 5 described in Figure 1, the first form of the invention, and may empty its fuel down thereinto through an inside pipe 67.

The city water-supply pipe 54 includes the valve 58 which is opened and closed by motor means. Its valve head 59 is preferably lifted upwardly in the casing 58 by a solenoid 60 or other electric-power driven means energized by current transmitted over an electric circuit 61. Upon opening or breaking the electric circuit 61 and deenergizing the solenoid or other motor means 60, it follows that a spring 62 positively returns the valve head 59 to its closed position to stop the flow of water from the city or other water source 54 into the storage tank 53, and hence discontinue the hydraulic lifting of gasoline upwardly through the inflow pipe 55 to the gravity-feed chamber 56. The circuit 61 may be controlled by an improved switch means in series and having the same general purposes in view as already explained in Figure 1. The valve 58 is open in Figure 2 and water is flowing into tank 53 under the fuel therein and floating it on top of the water and upwardly through pipe 55, through the open valve 7, into the overhead chamber 56.

The automatic control apparatus for this fuel supply system is designed to maintain substantially a constant and uniform liquid head and hence a continuous and uniform pressure through the discharge pipe 64 to the apparatus being fueled so as to avoid an unnecessarily large receiving chamber 56, and it is desired to restrict the size of this overhead gravity-feed receptacle 56 so that a limited supply of fuel is carried outside the underground tank 53 for obvious reasons. A gravity-feed or discharge pipe 64 connects with the lower part of chamber 56 and feeds fuel by gravity to engines or other places of consumption not shown. An upturned vent pipe 65 is attached to the upper portion of the chamber 56 to remove all pressure by venting the space above the normal-operating liquid level in the chamber. The automatic control of the liquid level in the chamber 56 prevents fuel from wasting outwardly through the vent pipe 65 and similarly prevents leakage or waste downwardly through the discharge pipe 64 by stopping the inflow of fuel upwardly through pipe 55 in case the feed through pipe 64 should become excessive. In other words, there must be an equalization of flow in the piping system 55—64 else the apparatus stops the flow entirely, due to the difference in rate of flow. This difference in flow rate is eliminated by the operator or tester in charge who finely adjusts the flow-regulator valve 13 (detailed in Figure 8) to equalize the reception of liquid through pipe 55 with the outgoing liquid through pipe 64.

The inflow pipe 55 enters the chamber 56 and may be turned downwardly on the inside thereof with a short length of pipe 67, thus pouring the fuel into the lower portion of the chamber under the float or floats to be described. A normal-level control valve 68 may, if desired, be included in the inflow or intake pipe line 55—67, and this valve is automatically opened and closed by a normal-level control float 69 carried on the outer end of a rod 70 which has its inner end operatively connected at 71 to the normal-level control valve 68 for opening and closing the latter within the range defined by the predetermined high and low operating levels designated at (1) and (2) in the several views.

So long as the liquid level varies slightly, i. e., within the operating range (4) well within the lines (1) and (2), and hence is normal the valve 68 itself tends to regulate the reception of liquid to the chamber 56 and the automatic means hereinafter described, as controlled by another or safety float 92, remains inactive. In other words, if the liquid level recedes toward the low safety shut-off level 2, the float 69 then lowers and partly opens valve 68 to admit more liquid and to bring the level up to the central line (3) which indicates a normal liquid level. On the other hand, should the liquid fuel level rise, the valve 68 gradually closes until the liquid level recedes to a central position well within the high and low safety shut-off levels. Thus there is provided a normal operating-level valve and float control unit 68—69 which continuously operates quite independently of the automatic features to be later described, although contributing to the general organization to make a positive safe system.

The self-closing safety shut or cut-off valve 7 heretofore described is mounted in the inflow pipe 55 and is held normally open, as already explained, in Figure 2, by a locking means or lock-open retaining means which sets or tensions the spring 28, Figure 6, or sets other power means, the weight 31 in Figure 1, thereby making the valve 7 ready for its self-closing operation. The latch 76 and automatic trip means 80 shown in Figure 3 is employed to hold the valve 7 in open position against the closing spring 28 or weight 31. In this connection, the valve-operating shaft 29 in Figure 2 carries a valve opening handle 74 with a catch 75 engaged by the latch 76. The latch 76 is pivoted at its other end on a pin 78 anchored in a frame plate or bracket 77 which carries the principal operating parts for valve 7 and also carries switch-operating parts to be described and is attached to the side of the chamber 56.

The latch 76 drops by gravity into engagement with the hook or catch 75 and hence holds the handle 74 at the position shown in Figure 2 against the closing force exerted by the spring 28 in the safety cut-off valve 7. A simple form of two-direction operating mechanism is provided for disengaging the latch 76 from the catch 75 to permit self closing of the valve 7 regardless of which direction the safety float 92 overtravels, up or down, in its normal movement. For this purpose a release, comprising a two-direction lever 80, is pivoted at 81 on the bracket 77 and this lever has a cam which moves both directions, up and down, to lift the latch 76 in one direction only, up, during either of said directions of lever 80, up or down. A cam 82 on the lever 80 lifts upwardly on the hook end 75 of the latch 76 when the lever 80 goes down. In the same way, a cam 83 lifts upwardly on the latch 76 when the lever 80 swings upwardly about its pivot 81. This two-direction cam 82—83 is rotated by the lever 80 and therefore acts to disengage the latch 76 from the valve 7 holding catch 75 regardless of the direction of motion of the lever 80. Therefore, as will be shown, rise or fall of the liquid level in chamber 56 may be translated into one motion, upwardly, to lift the latch 76.

A link 85 has its lower end pivotally connected at 86 to the lever 80 and has its upper end pivotally connected at 87 to an arm 88 which is anchored to a horizontal shaft 89 journaled in a stuffing box 90 carried in the wall of the liquid-receiving gravity-feed chamber 56. The inner end of the shaft 89 has a float arm 91 connected thereto and the float 92 is attached to the outer end of said float arm. This float 92 rides on the surface of the liquid in the receiving chamber 56 and oscillates the shaft 89 to reciprocate the rod 85 and thus control the action of the double or two-direction cam lever 80.

When the float 92 and the liquid head or level in the chamber is normal or well within the upper and lower safety shut-off levels (1) and (2), the valve latching and releasing assembly 76—80 remains in the position shown in Figures 2 and 3, whereby the valve 7 is locked open against the force of its closing means, but should the liquid level rise too high or fall too low, thus moving out of the normal operating range (4), it follows that the lever 80, by either rising or falling, trips the latch 76 upwardly to release the valve latch 76 to cause the spring 28 to automatically close the valve 7 under its own power and is therefore not dependent for its closing action upon the force exerted by the liquid level.

The operating shaft 29 for opening the valve disc 21 of valve 7 also mounts a switch-operating cam 94 designed to hold a switch 95 closed so long as the latch 76 holds valve 7 open. Any suitable form of switch may be used but ordinarily a standard mercury switch is used and it is sometimes called a murcoid switch. A diagrammatic form of mercury switch is illustrated by showing a glass mercury bulb 95 held by a band 96 on a tilting switch arm 97. The switch arm 97 is pivoted at 98 in a switch box 99 and a weight or other motor-switch opening means 100 is used to open the switch unless it is held up and closed against the force of the weight 100. A roller 101 is journaled in the switch arm 97 and travels on the cam 94 to hold the weight 100 up and maintain the mercury bulb 95 in tilted position so that a globule of mercury 102 closes the circuit across the terminals of the circuit wires 61.

In the position shown in Figure 2, the valve-operating handle 74 is set to the left and holds the cam 94 upwardly, which in turn has driven and holds the roller 101 up the cam 94 to tilt the mercury bulb 95 downwardly to close the circuit 61, and hence the solenoid or other magnet means 60 is energized and thus has lifted the valve head 59 to permit a full flow of water through pipe 54 into storage tank 53, hydraulically elevating liquid from the upper part of tank 53 through pipe 55, through the normally-open self-closing safety valve 7, up through the flow-regulator valve 13, on through the normal level control valve 68, hence through pipe 67 into the chamber 56.

When the latch 76 is tripped upwardly and thus disengages the catch 75, the spring and/or weight-loaded valve disc 21 in valve 7 automatically acts to close said valve 7. The spring 28, of course, then swings the arm 36 and shaft 29, Figure 6, in a counter-clockwise direction which also swings the switch-actuating cam 94 in a counter-clockwise direction to lower the latter, thereby enabling the switch weight 100 to move downwardly since the roller 101 will now roll along the surface of the lowered cam 94. This action tilts the mercury switch 95 counter-clockwise on pivot 98 and causes the globule of mercury 102 to roll to the left end of the mercury switch 95, thereby breaking the circuit 61, which in turn deenergizes the solenoid 60 and enables the spring 62 to automatically close the water valve 58—59, and at the same time the safety shut-off valve 7 is closed as just described.

The switch 95, the safety shut-off valve 7, and hydraulic-control valve 58, are all interconnected for conjoint operation and the two valves 7 and 58 simultaneously close as the switch 95 is opened. Not until the operator attends to the apparatus by manually adjusting, resetting and starting it, can liquid again be pumped up through pipe 55 to the chamber 56. This requirement makes for safety since the operator should now look for the cause of the automatic tripping action and make repair or adjustment thereof, making adjustment at the flow-regulator valve 13 if the consumption of liquid from pipe 64 has changed substantially.

While the one switch 95 may ordinarily be sufficient for all purposes of safety, still a second switch is connected in the circuit 61 in series with the first switch 95. The murcoid switch 95, in the form of the invention being described occupies the same relation as the switch 45—46 in the first form of the invention, and the second switch of this preferred form of the invention may be mounted in a switch box 105 and comprises another mercury switch of identically the same type as indicated at 95, and hence is not duplicated on the drawings. Suffice it to say that a switch operating arm 106 is pivoted at 107 in the switch box 105 for operating a second switch in series with switch 95 in the circuit 61. The circuit wires 61 lead, as shown, to the inside of each switch box 99 and 105 and connect in series with a switch 95 in each box.

The same float 92 which controls the action of the trip 80 and other parts including the switch 95, may also be used to operate the switch arm 106 and hence control a switch in the box 105. To this end, the switch arm 106 is slotted at 109 for the reception of a pin 110 carried in an extension 111 of the arm 88 heretofore described, and as seen in Figure 5. In other words, the arm 88 is operatively connected to both the switch arm 106 and the rod 85 so that in fact one float 92 may be employed to control two switch means 99 and 105 and the safety valve 7.

The two switch boxes 99 and 105 contain the mercury-switch mechanism connected in series in the one circuit 61. The one, two or more switches, as already mentioned, comprise standard type murcoid switches which are usually toggle-actuated in order to obtain a quick snapping action so as to rapidly throw the mercury globule 102 from one end to the other of the glass switch bulb. This positively-operating switch mechanism is protected in the two housings shown, and for simplicity one switch only is shown in a housing 99 broken away to show the switch 95 in diagrammatic form.

Viewed from the end, as in Figure 4, it is more readily seen that the bracket 77 is mounted on a lower corner of the chamber 56, and the valve 7 is carried on the bracket under the chamber. The operating handle 74 is forward of the bracket 77 so as to be closely adjacent to the bracket and the latch parts thereon 76 and 80. The two switch boxes 99 and 105 are above the bracket and handle 74, and the rod 85 extends downwardly alongside the chamber 56 at the opposite ends of the switch boxes to which the switch weight 100 and the cam 94 are mounted. This provides a compact construction.

It is clear enough that the upper switch means 105, or as represented by the arm 106, as well as the hydraulic valve 58—59 and safety valve 7, do not have to be set or adjusted by an operator when the system automatically shuts off all flow when the apparatus performs normally as expected without the operating range (4), but the switch 95 as well as the valve 7, do have to be attended by an operator and manually reset, and this is accomplished by simply swinging the handle 74 from its then right hand position shown in Figures 9 and 10 to an operating position shown in Figures 2 and 11. However, a careful operator will not reset the apparatus until he has discovered and corrected the cause of its automatic stopping operation for, if he does, the apparatus will again close the liquid inflow safety valve 7, close the hydraulic water valve 58 and open the one or more switches. The operator, by removing the cause which sets the mechanism in operation or by properly adjusting the flow-regulator valve 13, will again be able to start the liquid supply system in operation and it will positively function until some differential occurs in the rate of flow within the piping system 55—64.

Coming now to Figure 12 showing a simple embodiment of the invention comprising a new combination, there is shown a liquid-supply system which omits the safety self-closing valve 7 heretofore explained.

There are provided two tanks in this combination, one a large-size storage tank 120 and the other a small overhead gravity-feed receptacle 121 located above the storage tank. A discharge pipe 122 conveys liquid fuel from the small gravity-feed chamber 121 to the point of use, and a vent pipe 123 is provided in the usual way. An inflow pipe 124 conveys liquid fuel from the storage tank 120 to the gravity-feed chamber 121. A water-supply pipe 125 carries water from a city main or other source to the bottom of the storage tank 120 to float the liquid fuel out of the tank 120 and upwardly through inflow pipe 124 to the gravity-feed chamber 121.

A flow-regulator or equalizing valve 127 is included in the inflow pipe 124, and is employed to adjust the rate of flow up through pipe 124 to about equal the rate of down flow through the discharge pipe 122. This valve 127 is shown in detail in Figure 8. Any valve suited to this purpose may be used but the one shown has a sealed-in screw-adjustment plug incapable of being tampered with except by one in authority as heretofore explained in connection with Figure 8, where the seal 15ª secures the cap 15 in position on the valve housing.

The electrical-control system includes a circuit 129 to transmit current to a solenoid 130, which when energized opens a water-inlet valve 131 to admit water into the storage tank 120 to float the liquid fuel up to the gravity-feed chamber 121. When deenergized, as shown, the magnet means 130 allows the valve 131 to be closed by a spring 132 as shown in Figure 12 or equivalent mechanism such as a weight, to stop the flow of water and fuel.

Any suitable murcoid switch or mechanical switch 134—135 may be used to open and close the circuit 129, and the switch is under the control of float means 136. The stationary contact 134 is slidably engaged by the slide 135, the latter being attached to a rod 137 which is reciprocated by the float means 136 through operating connections, such as an outside arm 138 and inside arm 139 both fixed to a shaft 140 journaled in the chamber 121. When the float 136 moves above or below the predetermined operating range shown in Figure 12, the switch 134—135 is opened and consequently the inflow of liquid fuel to chamber 121 is discontinued, but so long as the liquid level is normal, the inflow is continuous and consequently the discharge from pipe 122 is not interrupted, and the head or pressure is constant. It is noted that a single link 137 acts to both open and close the switch 135—136.

The invention fills a want felt for a liquid-supply apparatus having a positive feed at a constant pressure, and one which is safe against all hazards met with in handling liquid fuels such as gasoline and oils, or other liquids.

What is claimed is:

1. In a liquid-supply system, a chamber, an inflow pipe connected thereto, including a self-acting valve, latch means to hold the self-acting valve to a predetermined set position, a cam adapted to turn in either direction and cooperating with the latch means to operate the latter, means connected to the cam and adapted to follow the rise and fall of the liquid in the chamber whereby rise of the liquid turns the cam in one direction and the fall thereof turns it in the other direction to release the latch in either event.

2. In a liquid-supply system, a chamber having an inflow pipe connected thereto, a self-acting valve in the pipe, latch means to hold the self-acting valve to a predetermined set position, lever means mounted for movement in two directions, liquid-level responsive means in the chamber and being operatively connected with the lever means to move the latter up and down, and a cam on the lever means engaging the latch means and the cam being movable in either direction to actuate the latch means in one direction only irrespective of which direction the lever means is moved.

3. In a liquid-supply system, a storage chamber of limited capacity, a valve connected with the chamber, operating means to actuate the valve, a pair of pivoted parallel arms, an end of one arm engaging the operating means to arrest the latter from movement, a portion of the other arm being adapted to engage the first arm, and means connected with the second arm and rising and falling with the level of the liquid in the chamber to actuate said second arm to disengage the other arm from the operating means to free the latter for movement to actuate the valve.

4. In liquid-control apparatus, a valve, operating means to actuate the valve, a latch means including an arm pivoted at one end and having means on its other end to engage and hold the operating means against motion, a tripping device pivotally mounted against the arm and including an eccentric portion formed on each side of the pivot whereby movement of said tripping device in either direction effects engagement of one or the other eccentrics with the latch means to release the latter from the operating means, and means responsive to liquid movement to actuate the tripping device.

5. In liquid-control apparatus having a limited-capacity chamber, an inflow pipe connected thereto, a safety valve in the pipe, motor means exerting a continuous force to operate the valve, a latch to arrest movement of the motor means, manually-operated means to simultaneously set the motor means and the latch in poised position ready for operation of the valve, a movable device having a normal operating range with means to release the latch irrespective of the direction of movement of said device beyond the upper and lower limits of the operating range, means in the chamber responsive to the upward and downward liquid movement therein and being connected with the device to impart motion to the latter, an electric circuit and switches included therein, means controlled by the circuit governing the inflow of liquid to the chamber, means operated by the motor means to operate one switch when the valve is operated, and means responsive to a change of liquid level in the chamber to operate another switch when the liquid level rises or falls in the chamber.

6. In float-controlled switch mechanism and the like for liquid-supply systems, a float movable up and down beyond the upper and lower limits of a predetermined normal-operating range, an electric circuit, means controlled by the circuit governing the inflow of liquid to the chamber, switches connected in the circuit, an operating connection from the float to one switch to open the latter when the float moves to the upper and lower limits of its normal-operating range and to close the switch when the float returns; an operating means interconnected between the float and another switch and not effective on this last named switch while the float moves within said limits of its normal-operating range, including means to positively open said last named switch when the float moves beyond said upper and lower limits, and means holding said last switch open until closed by an operator.

7. In float-controlled mechanism for liquid-supply systems, float means movable in a chamber through a limited operating range having an upper and lower limit, a supply pipe having a valve connected with the chamber, motor means to close the valve, manual means to open the valve and reset the motor means, a latch to hold the valve open, an operating connection from the float to the latch to trip the latter when the float means rises above or falls below its limited operating range, an electric circuit and switches connected therein, means controlled by the circuit governing the inflow of liquid to the chamber; and switch-actuating means operated by the float means to open one switch when the float approaches the upper and lower limits of its operating range and to close said switch when the float means returns therefrom and to open another switch when the float means moves beyond the upper and lower limits of its operating range but not to close said last named switch should the float means return to its operating range.

8. In float-controlled mechanism for liquid-supply systems, float means movable in a chamber through a limited operating range, a supply pipe and valve connected with the chamber, motor means to close the valve, manual means to open the valve, a latch to hold the valve open, an electric circuit and switches therein, means controlled by the circuit governing the inflow of liquid to the chamber, cam means operated by the float means to trip the latch, means operated by the float means to open and close one switch, and means controlled by the float means controlling the opening but not the closing of another switch when the float means moves out of the upper and lower limits of the operating range and then returns thereto.

9. In a liquid-supply apparatus, a receiving and dispensing chamber and a valve-controlled inlet therefor, a float in the chamber, a handle to move the valve in one direction, motor means to move the valve and handle in the other direction, an electric circuit having a switch therein, means controlled by the circuit governing the inflow of liquid to the chamber, a cam operated by the handle to close the switch, motor means to open said switch; a single latch means to hold the handle, the switch, and the valve to set position ready for operation by the motor means; and means, including a lever and a cam actuated by the float at the upper and lower limits of movement of the latter, to trip the latch whereby the motor means throws the handle and allows the valve to be closed and the switch to be opened.

10. In liquid-supply apparatus having a chamber, a valve-controlled inlet thereto and a float in the chamber, means to set the valve to open position, motor means to close the valve, a latch to lock the valve open against being closed by the motor means, a cam under the latch to lift the latter to release it from the valve, a lever carried on the cam, a connection between the lever and the float, and said cam including a double eccentric means whereby motion of the cam in either direction imparts a force to the latch which results in displacing the latch to release the valve.

11. In a liquid-supply apparatus, a chamber, a pipe connected therewith, a self-closing valve controlling the liquid flow through said pipe, latch means to hold open the self-closing valve, a pivoted cam cooperating with the latch means and releasing the latter upon pivotal movement in either direction to close the valve, and means connected to the cam and following the rise and fall of the liquid in the chamber whereby rise of the liquid turns the cam in one direction and fall thereof turns it in the other direction.

12. In a liquid-supply apparatus, a chamber, a pipe connected therewith, a self-closing valve controlling the liquid flow through said pipe, latch means to hold open the self-closing valve, a pivoted cam cooperating with the latch means and releasing the latter upon pivotal movement in either direction to close the valve, and means responsive to a difference in rate of flow in the system and connected to the cam for operating the latter in either direction when a predetermined difference in flow occurs.

13. In a liquid-supply apparatus, a chamber, a pipe connected with the chamber, a pair of switches mounted one above the other on the side of the chamber, a normally open safety cut-off valve under the lower switch and controlling the liquid flow through said pipe, a bracket attached to the chamber under the switches, a float in the chamber and arm connections therefrom to the upper switch, a rod extending downwardly adjacent the switches outside the chamber from the arm connections, a latch and releasing means therefor pivotally mounted on the bracket below the switches and being connected with the lower end of the rod, handle means for opening the safety cut-off valve and engageable with the latch, motor means to close the valve when the releasing means disengages the latch, and switch-operating means operatively connected with the safety cut-off valve and lower switch whereby the lower switch is normally closed by the handle and opened by the motor means which closes the valve.

14. A liquid-dispensing apparatus comprising a chamber, a pipe connected with the chamber, a bracket anchored to the lower corner of the chamber, a normally-open self-closing safety valve under the chamber behind the bracket, latch means pivoted on the bracket to disengage the latch means from the valve, a pair of series switch means mounted in boxes arranged above the bracket and attached to the side of the chamber, operating means to operatively connect the valve with one of the switches, a float in the chamber, and means operatively connecting the float with the pair of switch means and with the release means.

15. In liquid-supply apparatus, a pipe through which liquid flows, a normally-open safety cut-off valve controlling the liquid flow in the pipe, an electric circuit having two switches in series therein, means controlled by the circuit governing the supply of liquid through the pipe, operating means sensitive to a differential liquid flow in the pipe and a two-direction operating mechanism interconnecting the switches and valve and connected with the operating means to be moved thereby upon a predetermined differential flow of liquid in the pipe including means to open one switch upon a too great or too little differential flow and to close the switch upon return to normal liquid flow, and means to open the second switch and to close the cut-off valve at predetermined upper and lower limits of movement of the operating means, whereby the valve is open when both switches are closed and the valve is closed when one of the switches is open.

16. In liquid-supply apparatus, a pipe through which liquid flows, a safety cut-off valve controlling the liquid flow in the pipe, an electric circuit having two switches in series therein, means controlled by the circuit governing the supply of liquid to the pipe, operating means sensitive to a differential liquid flow in the pipe; and a two-direction operating mechanism connected with the operating means and moved thereby upon a too great or too little differential flow of liquid including means to open one switch upon increasing or decreasing differential liquid flow and to close that switch upon return to normal liquid flow, latch means to hold the valve open and the second switch closed, and means to release the latch means to open the second switch and to close the cut-off valve at predetermined upper and lower limits of movement of the operating means.

17. In liquid-supply apparatus, a pipe through which liquid flows, a safety cut-off valve controlling the liquid flow, an electric circuit having at least two switches in series therein, means controlled by the circuit governing the supply of liquid to the pipe, liquid contacting means sensitive to a differential liquid flow in the pipe; and a two-direction operating mechanism connected with the liquid contacting means and moved thereby upon a differential flow of liquid including means to open one switch upon increasing or decreasing differential liquid flow and to close that switch upon return to normal liquid flow, means tending to close the valve and open a second switch, latching means to hold the valve open and the second switch closed, and a two-direction cam operative upon movement in either direction to release the latch to open the second switch and to close the valve at predetermined upper and lower limits of the movement of the liquid contacting means.

CHARLES F. BECKWITH.
C. CURTIS MAIN.